United States Patent
Carney et al.

(10) Patent No.: US 9,538,232 B2
(45) Date of Patent: Jan. 3, 2017

(54) CHAPTERIZED STREAMING OF VIDEO CONTENT

(71) Applicant: Verizon Patent and Licensing, Inc., Basking Ridge, NJ (US)

(72) Inventors: Mark D. Carney, Sterling, VA (US); Martin W McKee, Herndon, VA (US); Jeffrey A. Jackson, Coppell, TX (US); Dante J. Pacella, Charles Town, WV (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 571 days.

(21) Appl. No.: 13/826,565

(22) Filed: Mar. 14, 2013

(65) Prior Publication Data

US 2014/0282681 A1   Sep. 18, 2014

(51) Int. Cl.
*H04N 7/16* (2011.01)
*H04N 21/433* (2011.01)
*H04N 21/454* (2011.01)
*H04N 21/845* (2011.01)

(52) U.S. Cl.
CPC ...... *H04N 21/4331* (2013.01); *H04N 21/4542* (2013.01); *H04N 21/8456* (2013.01)

(58) Field of Classification Search
CPC ............ H04N 21/4331; H04N 21/4542; H04N 21/8456
USPC ........................................................ 725/28
See application file for complete search history.

(56) References Cited

U.S. PATENT DOCUMENTS

| | | | | |
|---|---|---|---|---|
| 5,818,439 A * | 10/1998 | Nagasaka | ......... | G06F 17/30793 348/E7.073 |
| 5,973,683 A * | 10/1999 | Cragun | ................. | H04N 7/163 348/E7.061 |
| 6,701,528 B1 * | 3/2004 | Arsenault | .......... | H04N 7/17336 348/E7.073 |
| 7,313,808 B1 * | 12/2007 | Gupta | ................. | G11B 27/034 348/E7.061 |
| 7,324,555 B1 * | 1/2008 | Chen | ................... | H04N 7/17336 348/E5.008 |
| 7,421,455 B2 * | 9/2008 | Hua | ................... | G06F 17/30849 |
| 7,480,442 B2 * | 1/2009 | Girgensohn | ......... | G11B 27/034 386/241 |
| 7,996,791 B2 * | 8/2011 | Rashkovskiy | ..... | H04N 5/44543 709/219 |
| 8,554,056 B2 * | 10/2013 | Lee | ................... | G06F 17/30265 386/280 |
| 8,881,196 B2 * | 11/2014 | Fukuda | .................. | G06Q 30/00 725/110 |

(Continued)

*Primary Examiner* — An Son P Huynh

(57) ABSTRACT

A method includes sending, by a user device, a request for video content based on a selected video content chapter of the video content. The method also includes receiving video content information that includes a list of video content chapters of the video content. The method includes determining, for each listed video content chapter, whether the video content chapter has been previously stored on the user device. The method further includes downloading particular chapters of the video content in a priority order based on the selected chapter in response to a determination that the particular chapters have not been previously stored on the user device, and playing the video content based on the selected chapter.

19 Claims, 9 Drawing Sheets

(56) References Cited

U.S. PATENT DOCUMENTS

| | | | | |
|---|---|---|---|---|
| 9,118,814 B2* | 8/2015 | Janardhan | | H04N 7/17318 |
| 9,253,465 B2* | 2/2016 | Cha | | G11B 27/105 |
| 2002/0034373 A1* | 3/2002 | Morita | | G06F 17/30843 |
| | | | | 386/278 |
| 2002/0078174 A1* | 6/2002 | Sim | | G06F 17/30194 |
| | | | | 709/219 |
| 2002/0097984 A1* | 7/2002 | Abecassis | | G11B 19/02 |
| | | | | 386/344 |
| 2002/0133830 A1* | 9/2002 | Kim et al. | | 725/142 |
| 2002/0174430 A1* | 11/2002 | Ellis | | G11B 27/005 |
| | | | | 725/46 |
| 2003/0048671 A1* | 3/2003 | Yoshikawa et al. | | 365/200 |
| 2003/0063407 A1* | 4/2003 | Zimmerman | | G11B 27/005 |
| | | | | 360/68 |
| 2003/0093803 A1* | 5/2003 | Ishikawa | | H04N 7/17318 |
| | | | | 725/94 |
| 2003/0194211 A1* | 10/2003 | Abecassis | | G11B 19/02 |
| | | | | 386/234 |
| 2004/0019608 A1* | 1/2004 | Obrador | | G06F 17/30044 |
| 2004/0197088 A1* | 10/2004 | Ferman | | G06F 3/0481 |
| | | | | 386/251 |
| 2004/0221311 A1* | 11/2004 | Dow | | G06F 17/30784 |
| | | | | 725/52 |
| 2005/0010952 A1* | 1/2005 | Gleissner | | G09B 5/06 |
| | | | | 725/46 |
| 2005/0062888 A1* | 3/2005 | Wood | | H04N 5/775 |
| | | | | 348/553 |
| 2005/0204385 A1* | 9/2005 | Sull | | G06F 17/30817 |
| | | | | 725/45 |
| 2005/0281535 A1* | 12/2005 | Fu | | G06F 17/30802 |
| | | | | 386/232 |
| 2006/0064383 A1* | 3/2006 | Marking | | G06Q 20/3829 |
| | | | | 705/57 |
| 2006/0130118 A1* | 6/2006 | Damm | | H04L 63/0245 |
| | | | | 725/135 |
| 2007/0011702 A1* | 1/2007 | Vaysman | | H04N 21/84 |
| | | | | 725/135 |
| 2007/0088844 A1* | 4/2007 | Seims | | H04L 29/06027 |
| | | | | 709/231 |
| 2007/0121629 A1* | 5/2007 | Cuijpers | | H04L 12/1859 |
| | | | | 370/390 |
| 2007/0154163 A1* | 7/2007 | Cordray | | H04N 21/6187 |
| | | | | 386/278 |
| 2007/0154169 A1* | 7/2007 | Cordray | | H04N 5/44543 |
| | | | | 386/230 |
| 2007/0199041 A1* | 8/2007 | Noll | | H04N 7/17318 |
| | | | | 725/135 |
| 2007/0206923 A1* | 9/2007 | Murakoshi | | G11B 27/28 |
| | | | | 386/230 |
| 2009/0010426 A1* | 1/2009 | Redmond | | H04L 29/06027 |
| | | | | 380/29 |
| 2009/0055880 A1* | 2/2009 | Batteram | | H04N 7/17318 |
| | | | | 725/100 |
| 2009/0058822 A1* | 3/2009 | Chaudhri | | G06F 3/04883 |
| | | | | 345/173 |
| 2009/0063681 A1* | 3/2009 | Ramakrishnan | | H04N 7/17318 |
| | | | | 709/225 |
| 2009/0158326 A1* | 6/2009 | Hunt | | G06F 3/04817 |
| | | | | 725/38 |
| 2009/0178089 A1* | 7/2009 | Picco | | H04N 7/17336 |
| | | | | 725/87 |
| 2009/0222730 A1* | 9/2009 | Wixson | | H04N 7/17318 |
| | | | | 715/723 |
| 2009/0328115 A1* | 12/2009 | Malik | | H04N 7/17318 |
| | | | | 725/93 |
| 2010/0031162 A1* | 2/2010 | Wiser | | G06Q 30/0255 |
| | | | | 715/747 |
| 2010/0058405 A1* | 3/2010 | Ramakrishnan | | H04N 7/17318 |
| | | | | 725/97 |
| 2010/0077285 A1* | 3/2010 | Bailey | | 715/201 |
| 2010/0153573 A1* | 6/2010 | Huang | | H04L 67/2833 |
| | | | | 709/231 |
| 2010/0153885 A1* | 6/2010 | Yates | | G06F 3/0482 |
| | | | | 715/841 |
| 2010/0158109 A1* | 6/2010 | Dahlby | | H04N 7/17318 |
| | | | | 375/240.03 |
| 2010/0162313 A1* | 6/2010 | Ruiz-Velasco | | G11B 27/329 |
| | | | | 725/44 |
| 2011/0052146 A1* | 3/2011 | Murthy | | H04N 7/17318 |
| | | | | 386/243 |
| 2011/0078717 A1* | 3/2011 | Drummond | | H04N 21/4586 |
| | | | | 725/14 |
| 2011/0106961 A1* | 5/2011 | Glasser | | H04L 67/1008 |
| | | | | 709/231 |
| 2011/0107220 A1* | 5/2011 | Perlman | | A63F 13/12 |
| | | | | 715/720 |
| 2011/0161818 A1* | 6/2011 | Viljamaa | | G11B 27/28 |
| | | | | 715/720 |
| 2011/0239078 A1* | 9/2011 | Luby | | H04N 21/23106 |
| | | | | 714/752 |
| 2011/0262104 A1* | 10/2011 | Kiyosawa | | G11B 27/005 |
| | | | | 386/241 |
| 2012/0079054 A1* | 3/2012 | Moroney | | H04N 21/4126 |
| | | | | 709/213 |
| 2012/0093476 A1* | 4/2012 | Mountain | | H04N 21/4312 |
| | | | | 386/230 |
| 2012/0180095 A1* | 7/2012 | Tanaka | | G11B 27/034 |
| | | | | 725/88 |
| 2014/0161417 A1* | 6/2014 | Kurupacheril | | H04N 5/76 |
| | | | | 386/241 |

* cited by examiner

FIG. 6

| MEDIA ID 602 | SHOW ID 604 | SHOW NAME 606 | SEAS NUM 608 | EP NUM 610 | EP NAME 612 | CHAP NUM 614 | CHAP NAME 616 | TAGS 618 | RTNG 620 | RPT 622 | CACHE DATE 624 |
|---|---|---|---|---|---|---|---|---|---|---|---|
| MEDA1 | SHOW1 | BAD 1S | NULL | NULL | NULL | 12.1 | SCN A | LANG | PG13 | N | DAT1 |
| MEDA2 | SHOW1 | BAD 1S | NULL | NULL | NULL | 12.2 | SCN B | NUD | R | N | DAT2 |
| MEDA3 | SHOW1 | BAD 1S | NULL | NULL | NULL | 12.3 | SCN B | NULL | PG13 | N | DAT3 |
| MEDB2 | SHOW2 | MOSH | 1 | 1 | PILOT | 1 | NULL | LANG | TVG | Y | DAT4 |
| MEDB2 | SHOW 2 | MOSH | 1 | 1 | PILOT | 7 | NULL | NUD | TVG | Y | DAT5 |
| MEDB2 | SHOW 2 | MOSH | 1 | 12 | DOC | 6 | NULL | NULL | TVG | N | DAT3 |
| MEDK1 | SHOW 2 | MOSH | 4 | 1 | ROCK | 4 | NULL | NULL | TVPG | Y | DAT4 |
| MEDK2 | SHOW2 | MOSH | 4 | 1 | ROCK | 1 | NULL | NULL | TVPG | Y | DAT5 |

600

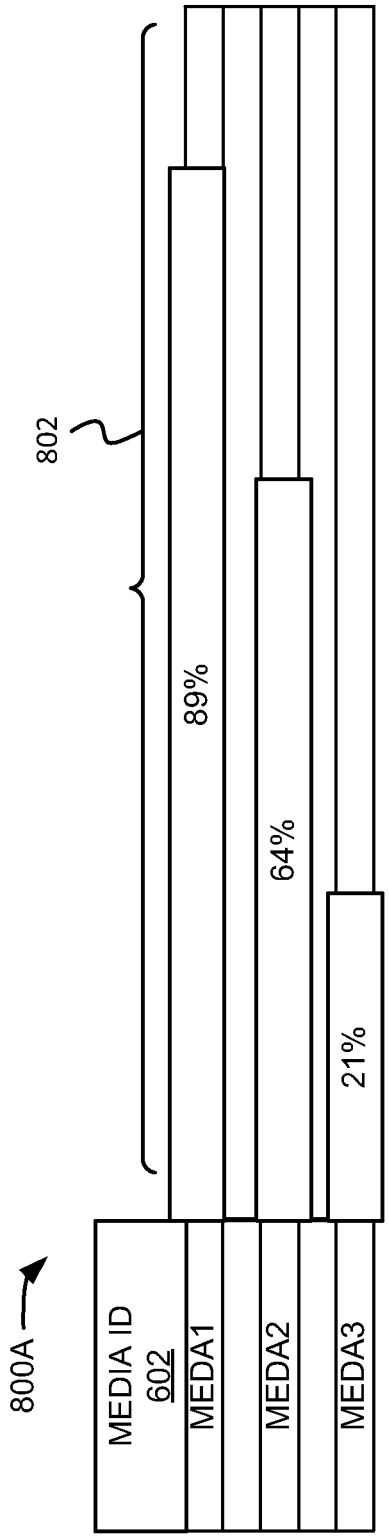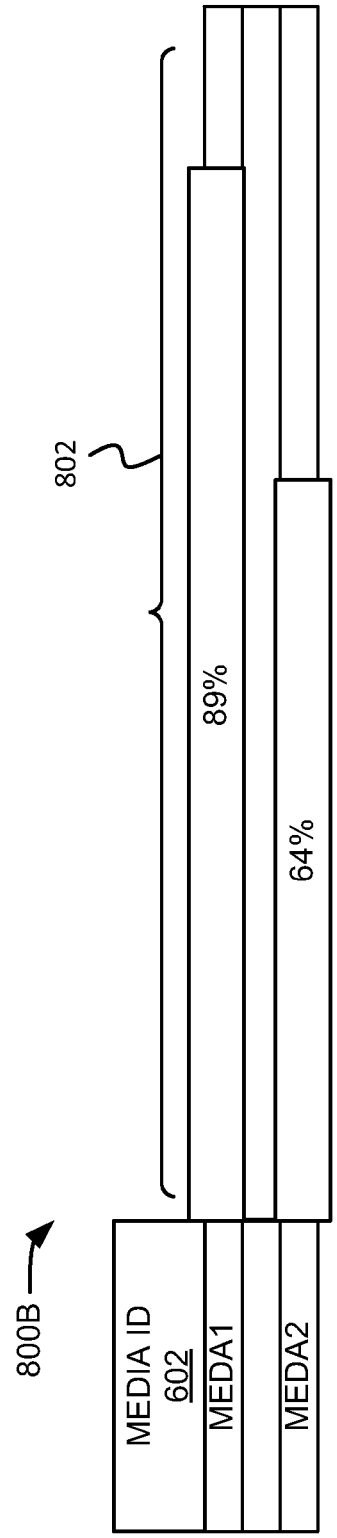

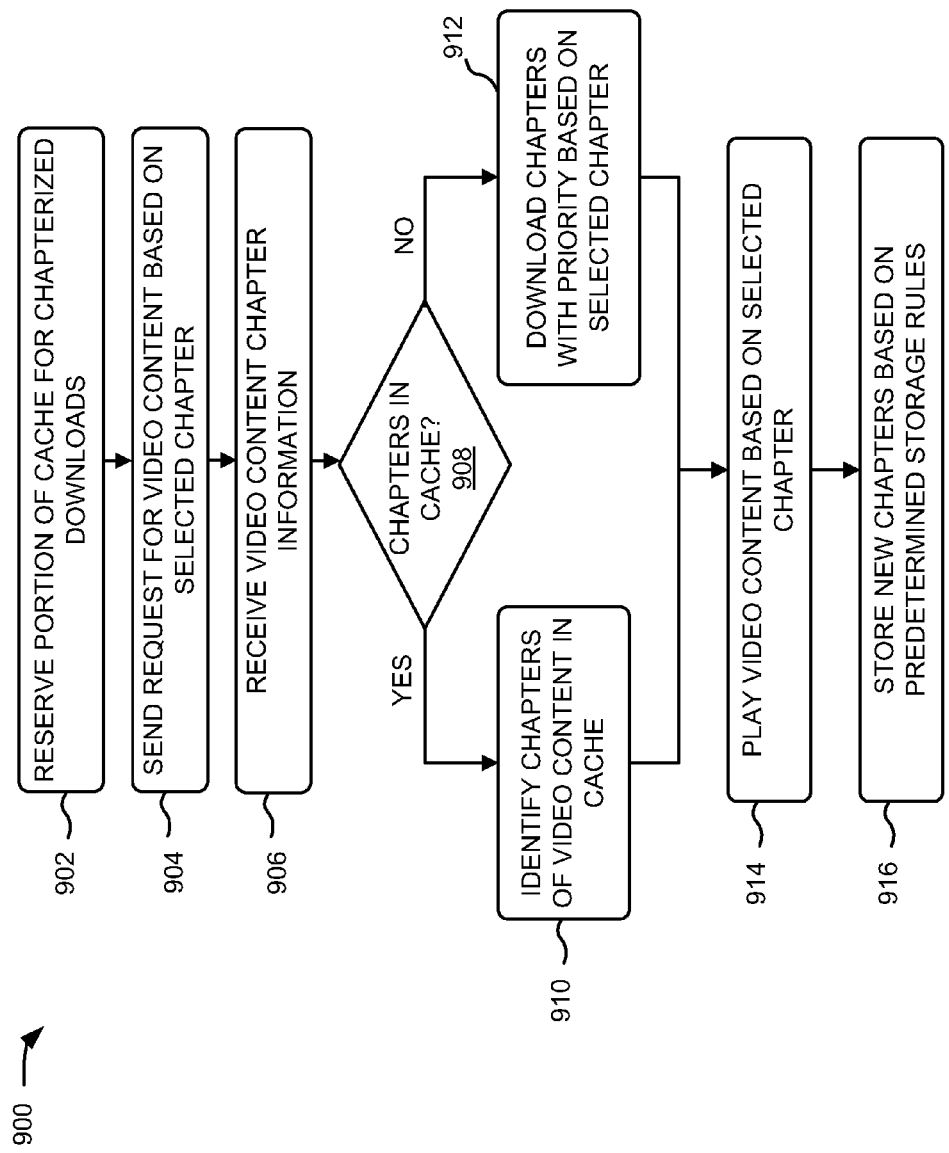

CHAPTERIZED STREAMING OF VIDEO CONTENT

BACKGROUND

Video service providers currently provide multiple services and programs, including cable television, network television, and video-on-demand content, to their customers. Individual customers may receive combinations of these services from one or more video service providers. Video service providers manage relationships with their customers using customer accounts that correspond to the multiple services.

BRIEF DESCRIPTION OF THE DRAWINGS

FIG. 6 is an exemplary chapterized streaming table;

FIGS. 8A and 8B are diagrams showing chapterized download status for video content associated with particular users; and FIG. 9 is a flowchart of an exemplary process for performing chapterized streaming of video content.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may implement chapterized streaming of video content. The video content may be downloaded in chapters that contain defined viewing units based on time intervals, scenes, or other predetermined factors related to the video content, such as an appearance of a particular actor, particular audio, a transition in a storyline, etc. A user device may create a cache corresponding to each chapter of video content and for each chapter and, in addition to a chapter that is currently being viewed, may download a segment corresponding to each of the remaining chapters. The system may implement pre-caching or pre-downloading that substantially reduces bandwidth used for downloading video content and provides faster/smoother/more accurate access to desired scenes.

Consistent with embodiments, chapterized downloads may be filtered based on selected criteria, such as rating, objectionable language, etc. Service providers may offer streamed media in a chapterized format to allow users to skip past undesired chapters to reach the chapters that they currently wish to view quickly and precisely. Chapterized downloads reduces congestion on the service provider network, and loads on servers maintained by the service provider.

As used herein, the terms "user," "consumer," "subscriber," and/or "customer" may be used interchangeably. Also, the terms "user," "consumer," "subscriber," and/or "customer" are intended to be broadly interpreted to include a user device or a user of a user device.

Figure 1:
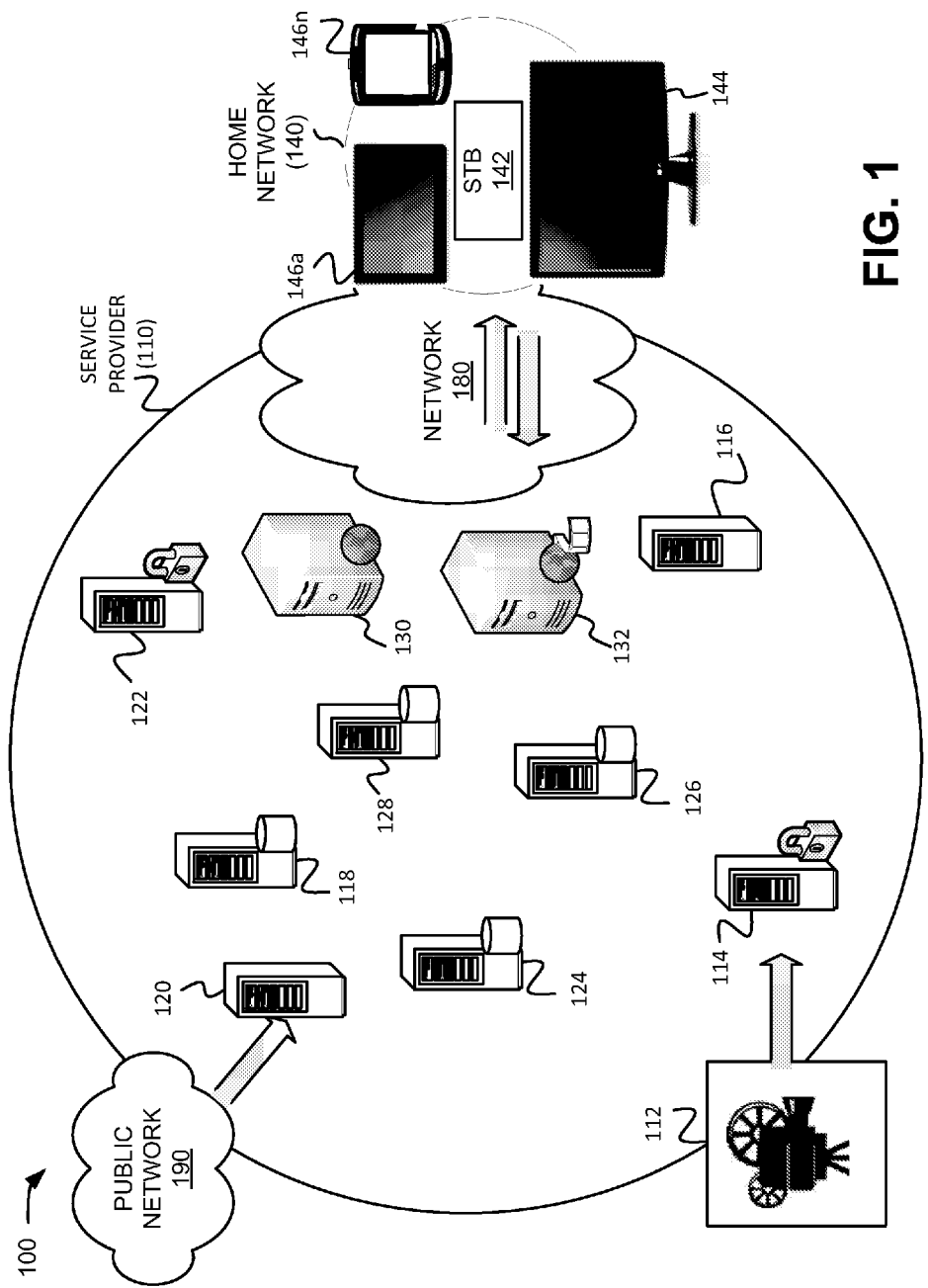
FIG. 1 illustrates an exemplary environment in which systems and methods described herein may be implemented.

FIG. 1 illustrates an exemplary environment 100 in which systems and/or methods described herein may be implemented. As shown in FIG. 1, environment 100 may include a video service provider network 110, a home network 140, an access network 180, and a public network 190. Video service provider network 110 may include a content provider 112 (or alternatively, video service provider network 110 may receive video content from content provider 112), a content processing system 114, a content delivery system 116, a search server 118, a guide server 120, an application server 122, a profile server 124, a license server 128, a web server 130, and a chapterized streaming server 132. Home network 140 may include one or more STBs 142, televisions 144, one or more user devices 146a through 146n, and/or personal computers. Devices and/or networks of FIG. 1 may be connected via wired and/or wireless connections.

Video service provider network 110 may collect, generate, and provide video content to subscribers/recipients of a video service. Video content may include, for example, encoded video content in any of a variety of formats, including, for example, Multiview Video Coding (MVC), Moving Picture Experts Group (MPEG)-2 TS, MPEG-4 advanced video coding (AVC)/H.264. Video service provider network 110 may be implemented with chapterized functionality for video content in which search, download and other functions associated with video content are executed on a chapter by chapter basis. The chapters may be segments of the video content that are determined based on scenes, predetermined time periods, appearance of actors, audio components, or other predetermined factors. Each video content chapter includes a viewing unit determined based on a viewer observable logical scheme. For example, one viewer observable logical scheme may include sets of chapters that begin when a scene begins. The chapters within a scene may be restricted in length within a predetermined range and of equal length within a particular scene (e.g., with a chapter range limit within thirty seconds to forty seconds, a one minute forty five second scene may include three thirty five second chapters).

Content provider 112 may include one or more providers of video content. For example, content provider 112 may include a television network, a cable television station, a film distributor, etc. Content provider 112 may provide video content to content processing system 114 in a variety of signals and formats, such as a baseband video signal, MPEG video, etc.

Content processing system 114 may store and process video content. Content processing system 114 may encode video content using, for example, public/private keys. Content processing system 114 may also transcode the video content. Content processing system 114 may store video content in an encrypted and/or encoded form. In some implementations, content processing system 114 may incorporate some or all of the functions described hereinbelow with respect to chapterized streaming server 132.

Content delivery system 116 may provide video content, instructions, and/or other information to home network 140 and associated devices, such as set-top-box (STB) 142 and user devices 146a-146n (collectively referred to as user devices 146 and individually as user device 146). In one implementation, content delivery system 116 may provide broadcast video content via a quadrature amplitude modulation (QAM) based system that may be limited in bandwidth capacity (i.e., a number and/or quality of channels may be limited based on the capacity of video service provider network 110). In other implementations, content delivery system 116 may provide video content via adaptive coding modulation (ACM).

Content delivery system 116 may temporarily store and provide content requested by user device 146 and/or STB 142. In one implementation, access to content delivery system 116 (e.g., by STB 142 and/or user device 146) may be restricted by a service provider that operates content delivery system 116. For example, access to content delivery system 116 may be restricted to particular users with particular subscription packages and enforced by, for example, password protection, device identifiers (for user devices 146a-146n, STB 142 and/or home network 140), and/or application identifiers (e.g., residing on user devices 146a-146n, STB 142 and/or portable media). Content delivery system 116 may include other devices (not shown), such as a content server, a policy management server, a streaming device, a router, a content cache, etc.

Search server 118 may provide support for an integrated video search function (executed by STBs 142, televisions 144, one or more user devices 146, and/or personal computers at home network 140), for searching among video content that may be provided to subscribers by a content delivery system 116, and video content that may be provided by an associated external network, such as the Internet. The video content may be provided at particular subscribed channels (i.e., an ongoing live broadcast that is part of the subscriber's package), on a pay-per-view basis, or "on demand" (i.e., particular content may be provided upon user request).

Guide server 120 may provide an integrated video guide to subscribers. The integrated video guide may include integrated video content from a video service provider network 110, such as a QAM based system, and from an additional network, such as the Internet. The integrated video guide may provide listings of channels, viewing times, descriptions of video content, access restrictions, payment requirements, etc. In some implementations, guide server 120 may integrate chapterization functionality for video content to allow access to video content on a per chapter basis.

Application server 122 may provide one or more applications that may allow subscribers to browse, purchase, rent, subscribe, and/or view video content. Application server 122 may authenticate a user who desires to purchase, rent, or subscribe to video content. In one implementation, application server 122 may interact with STB 142 or user device 146 using the hypertext transfer protocol (HTTP) or the secure HTTP (HTTPS). In another implementation, application server 122, STB 142 and user device 146 may interact with one another using another type of protocol.

Profile server 124 may store user profile information for users (e.g., users of user devices 146). The user profile information may include, for example, login information (e.g., a user identifier and a password), targetable information associated with the user (e.g., types of products purchased by the user, income of the user, household characteristics, etc.), demographic information, billing information, address information (including zip codes), types of services to which the user has subscribed, a list of video content purchased by the user, a list of video content rented by the user, a list of channels or video content to which the user has subscribed, a list of users associated with the user account, ratings of video content by the user, a user device identifier (e.g., a media player identifier, a mobile device identifier, a set top box identifier, a personal computer identifier) for devices, such as STB 142, user device 146, etc. Application server 122 may use the user profile information from profile server 124 to authenticate a user (or associated users) and may update the user profile information based on the user's activity (e.g., with the user's express permission).

License server 128 may provide key and license management. License server 128 may communicate with user devices 146 and/or STB 142 directly or via application server 122. For example, license server 128 may receive a request from STB 142 for a license relating to video content that STB 142 has downloaded. The license may include information regarding the type of use permitted by user device 146 or STB 142 (e.g., a purchase, a rental, limited shared usage, or a subscription) and a decryption key that permits STB 142 to decrypt the video content or application. In one implementation, the communications between license server 128 and STB 142 may be conducted over a secure channel, may include the use of public and private keys, or may include other forms of secure communication.

Web server 130 may allow a user to access chapterized video content through the Internet. Web server 130 may deliver web pages that clients may use to request video content. Web server 130 may be implemented in conjunction with chapterized streaming server 132 to provide video content on a chapterized streaming basis.

Chapterized streaming server 132 may stream chapterized video content based on requests for video content received from end user devices, such as user device 146. Chapterized video content includes video content that is segmented into chapters that contain defined viewing units based on time intervals, scenes, or other predetermined factors. Video content is chapterized when the video content is segmented into chapters of video content. Each chapter may be uniquely identified based on information associated with the video content in the particular chapter, such as a rating, a type of scene, language, etc. In one example, chapters may be synchronized with the appearance of particular characters, audio components associated with the video content, and other viewer observed components of the video content. Chapters may be downloaded and played in a consecutive, seamless manner. Chapterized streaming server 132 is described in greater detail below with reference to FIG. 2.

Home network 140 may include one or more devices that transmit requests to content delivery system 116, search server 118, guide server 120, application server 122, profile server 124, license server 128, web server 130 and/or chapterized streaming server 132, and receive information from content delivery system 116, search server 118, guide server 120, application server 122, profile server 124, license server 128, web server 130 and/or chapterized streaming server 132. Home network 140 may include, for example, one or more STBs 142, televisions 144, one or more user devices 146, and/or personal computers. Home network 140 may also include other devices (not shown), such as additional media storage devices, a home router, a gateway (e.g., an optical network terminal (ONT)), etc.

STB 142 may receive content from content delivery system 116, and/or an external network, such as the Internet, and output the content to TV 144 and/or user devices 146a-146n. For example, STB 142 may receive a range of channels from content delivery system 116 via QAM. STB 142 may include a component (e.g., a cable card or a software application) that plugs into a host device (e.g., TVs 144, and/or other devices, such as personal computers, mobile telephones, etc.) that allows the host device to play content. STB 142 may also be implemented as a home theater personal computer (HTPC), an optical disk player (e.g., digital video disk (DVD) or Blu-Ray™ disc player), a cable card, etc. STB 142 may receive commands from other devices in environment 100, such as a remote control (not shown) and user device 146. STB 142 may include one or more digital video recorders (DVRs) that allow STB 142 to record content and to playback the recorded content at a later time. In one embodiment, STB 142 may include a microphone and/or a camera.

TV 144 may include speakers as well as a display. TV 144 may play content, for example, received from STB 142. While some embodiments described below may use TV 144 to play content, other embodiments may use any device (e.g., a computer or a mobile phone) to play/provide content.

User device 146 may include any device capable of communicating via a network, such as home network 140 and/or access network 180. User device 146 may include an interactive client interface, such as a graphic user interface (GUI). User device 146 may include digital rights management (DRM) functionality to retrieve security information (e.g., decryption keys) and decrypt protected content received from content delivery system 116. Examples of user device 146 may include a mobile phone, a tablet, a personal computer, or another device that may receive video program related items, such as video program related applications and video program related content, and provide the video program related items at user device 146. User device 146 may include a chapterized streaming client that allows the user to download video content in a chapterized format, such as described herein below with respect to FIG. 5.

Access network 180 may provide customers with multimedia content from (e.g., from content delivery system 116). Access network 180 may include a local area network (LAN), a wide area network (WAN), such as a cellular network, a satellite network, a fiber optic network, a private WAN, or a combination of the Internet and a private WAN, etc. that is used to transport data. Although shown as a single element in FIG. 1, access network 180 may include a number of networks that provide services to home network 140. In one implementation, access network 180 may be connected to home network 140 via an optical communication link, such as an optical fiber provided to home network 140. In another implementation, access network 180 may be connected to home network 140 via a coaxial cable. In still another implementation, access network 180 may be connected to home network 140 via a wireless (e.g., satellite) connection.

Public network 190 may include a WAN, an intranet, a telephone network (e.g., the Public Switched Telephone Network), or a combination of networks. Public network 190 may include, for example, an untrusted network, such as the Internet. Public network 190 may further include network devices such as routers, switches, and/or firewalls.

While FIG. 1 shows a particular number and arrangement of networks and/or devices, in practice, environment 100 may include additional networks/devices, fewer networks/devices, different networks/devices, or differently arranged networks/devices than are shown in FIG. 1. For example, content delivery system 116 may be implemented as multiple devices.

In implementations described herein, a system and method of streaming video content in a chapterized format is disclosed. The system may be implemented using end user devices, such as a DVR, a mobile device or a computer. The end user devices may download, play and cache the video content in chapterized format.

Figure 2:
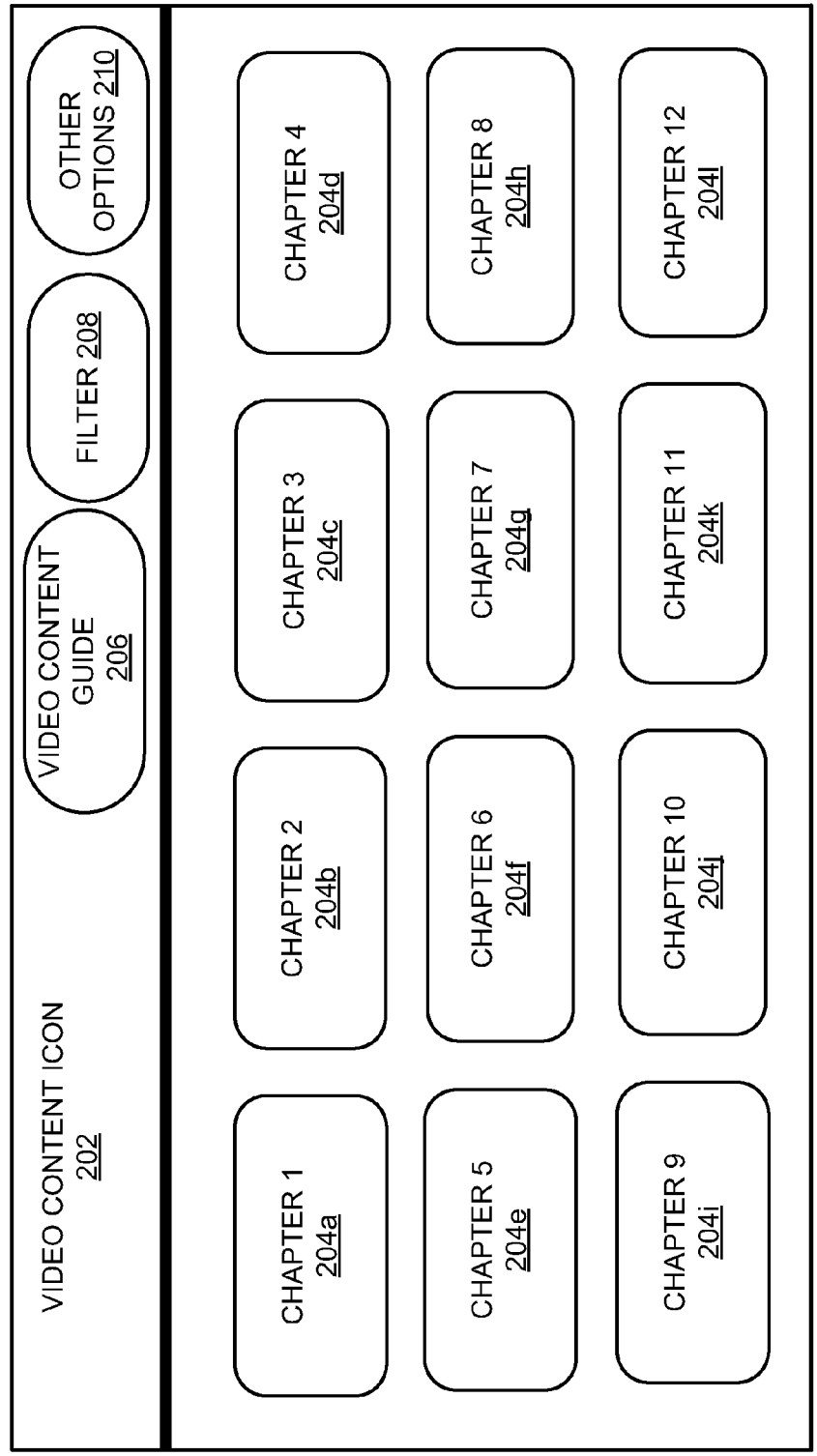
FIG. 2 is an exemplary video content chapter interface.

FIG. 2 illustrates an exemplary video content chapter interface 200. Video content chapter interface 200 may provide an ability to select video content on a per chapter basis. Video content chapter interface 200 may include a video content icon 202 and video content chapter icons 204a-204l representing each chapter of the video content. Video content chapter interface 200 may also include a video content guide 206, a filter 208 and an "other options" link 210. Video content chapter interface 200 may be accessed via a client-side device such as user device 146. Alternatively, video content chapter interface 200 may be accessed on an STB 142 and displayed on television 144. Although a particular number and arrangement of video content chapter icons 204 and additional links are shown with respect to FIG. 2 (a video content guide 206, filter 208, other options 210), in practice there may be more, less, or differently arranged links.

Video content icon 202 may indicate a particular program that the user is currently accessing (e.g., TV show, movie, etc.). The user may select any video content chapter icon 204 to begin playing the video content at the beginning of that particular chapter. The chapters may be determined based on information corresponding to presentation of the video content in other formats, such as disc storage presentation format (e.g., Blu-Ray, DVD, etc.). Video content chapter icons 204 may be auto-generated based on a screen grab from a set time after the start of the chapter (or first non-dark frame, etc.). Alternatively, user device 146 may provide the user with a listing (not shown) of chapters and the user may select a chapter that they want to view. In another example, video content chapter interface 200 may allow the user to scroll through a list which has significant scenes, chapter names, a short clip that displays next to the chapter name, synopsis of chapter, character/actor listings, etc. In any event, subsequent chapters may automatically play in sequence following the selected chapter to provide a seamless viewing experience for the overall video content.

Video content guide 206 link may allow the user to exit the overview of the video content and access other programs. For example, video content chapter interface 200 may allow the user to exit to an electronic storefront at which channels or video content may be selected (e.g., browsed, rented, or purchased). Filter 208 may allow the user to filter the video content based on particular criteria indicated in metadata associated with the chapter, such as a rating associated with the particular chapter, particular types of scenes, actors, etc. Other options" 210 link may allow the user to select further options associated with the video content, such as additional chapters, close captioning, etc.

The chapters of video content (or portions of the chapters) may be downloaded and pre-cached in a priority order based on available bandwidth and an expected pattern of viewing to ensure that display of the video content in instances where the user transitions from chapter to chapter (e.g., the user may move forward to or go back to a chapter) is seamless. The download capacity may be distributed across all chapters. A sufficient portion of each chapter may be downloaded so that the user may begin to view the later chapters without waiting for the buffer of user device 146 to fill. With the pre-cached chapters, when the user skips forward or back, there is enough data there to immediately show video content while allowing the remainder to be pulled across the network in instances in which the remainder has not yet been downloaded. In one example, user device 146 may provide an option to pre-cache either the first N seconds of each chapter or to pre-cache the entire video content. Pre-caching of the first portion of each chapter may be prioritized immediately after ensuring enough content in the current chapter to provide seamless viewing yet before completion of any other chapter. Determination of the number of seconds may be arbitrary, user-determined or calculated based on available bandwidth, server response times and other factors to ensure that the amount of data cached for each chapter will be sufficient to provide an uninterrupted viewing experience upon selection of any given chapter while allowing enough time for negotiation with chapterized streaming server 132 and downloading of additional content for that chapter The chapters may be downloaded, displayed and retained subject to digital rights management associated with the video content. For example, the chapters may be retained for different times based on purchase rights, rental rights, or streaming rights. Although chapters are described with respect to display on a selectable user interface, in some instances the chapters may be downloaded to user device 146 without providing an overview of the chapters (such as shown in FIG. 2). Additionally, in some implementations, provided license and key data may be cached by the STB 142 or user devices 146 to reduce load on the key servers or to allow use of content during transit when mobile devices may not be able to reliably reach the key server.

In another implementation, in addition to display functions, television 144 may include an ability to run applications in a similar manner as described with respect to user device 146 and provide access to the video content chapter interface 200. This implementation may include overlays and/or picture-in-picture features.

Figure 3:
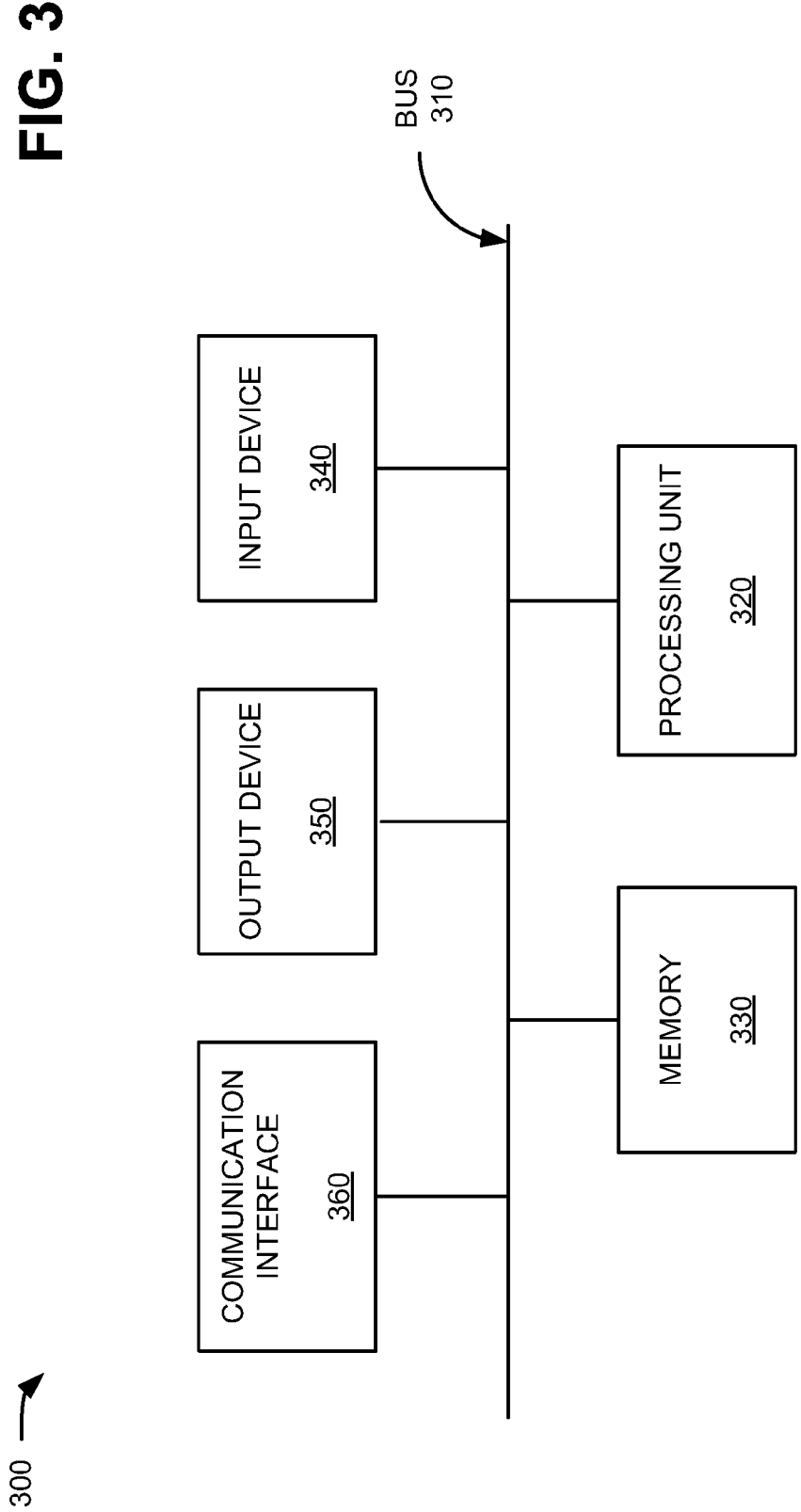
FIG. 3 illustrates an exemplary configuration of one or more of the components of FIGS. 1 and 2.

FIG. 3 is a diagram of example components of a device 300. Each of content provider 112, content processing system 114, content delivery system 116, search server 118, guide server 120, application server 122, profile server 124, license server 128, web server 130, chapterized streaming server 132, and/or devices in home network 140, such as STB 142, user devices 146a-146n, may include one or more devices 300. As shown in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include a transceiver that enables device 300 to communicate with other devices and/or systems. For example, communication interface 360 may include mechanisms for communicating with other devices, such as other devices of environment 100.

As described herein, device 300 may perform certain operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4:
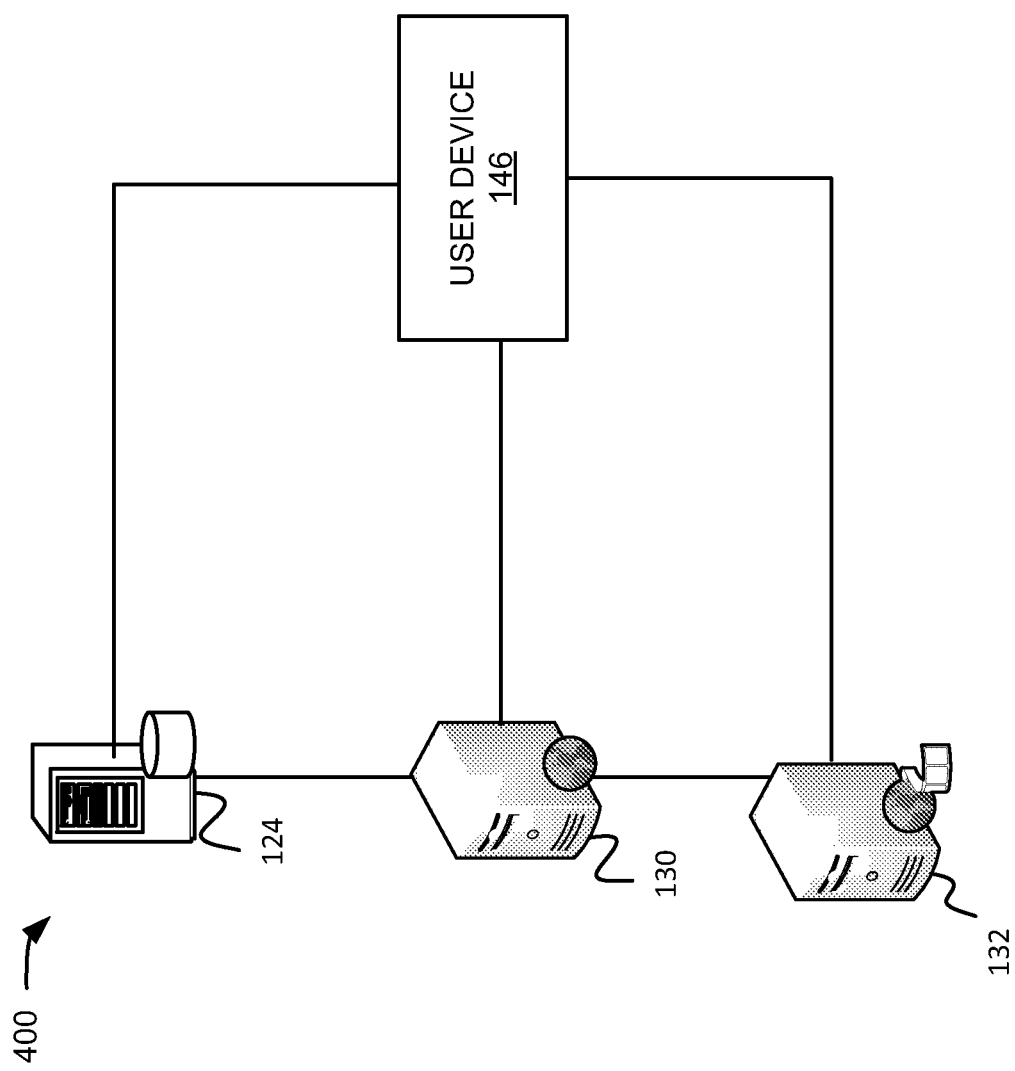
FIG. 4 illustrates a portion of the environment of FIG. 1 in which systems and methods described herein may be implemented.

FIG. 4 is a functional block diagram of a chapterized streaming portion 400 of environment 100 in which systems and/or methods described herein may be implemented. Chapterized streaming portion 400 may include profile server 124, web server 130, chapterized streaming server 132 and user device 146.

Chapterized streaming portion 400 may include components of network 100 that directly implement chapterized streaming of video content in environment 100. Alternatively, the components of chapterized streaming portion 400 may be implemented in another network to provide chapterized streaming of video content. In any event, chapterized streaming portion 400 may be used to stream video content from a service provider to end users in a chapterized format.

Profile server 124 may hold per-user and/or per-device preferences for video content on a per chapter basis. The preferences may include parental control settings, preferred display format, subtitle defaults, relevant advertising settings, most-watched media, etc. For example, content exceeding a parental control threshold may not be displayed (either excluded from a video guide/menu or these chapter may be omitted from the provided content).

Web server 130 may provide video content to user device 146 via the Internet. In some instances, web server 130 may proxy (requested) data from chapterized streaming server 132 to user device 146. In other instances, web server 130 may provide user device 146 with a URL to the video content on chapterized streaming server 132. Web server 130 may check for parental control settings (or other preferences) on profile server 124 and alter the provided content based on that the parental controls.

Chapterized streaming server 132 may provide video content to user devices 146 in a chapterized format (i.e., downloads may be provided in segments). Chapterized streaming server 132 may contain both the network interface used to stream content and the video content that is to be streamed or this functionality may be split between several systems (e.g., content provider 112, a content processing system 114, and/or a content delivery system 116). Alternatively, chapterized streaming server 132 may include an application interface from which data about a requested object may be provided in a parsable format for the requesting user device 146 (e.g., in association with application server 122).

Figure 5:
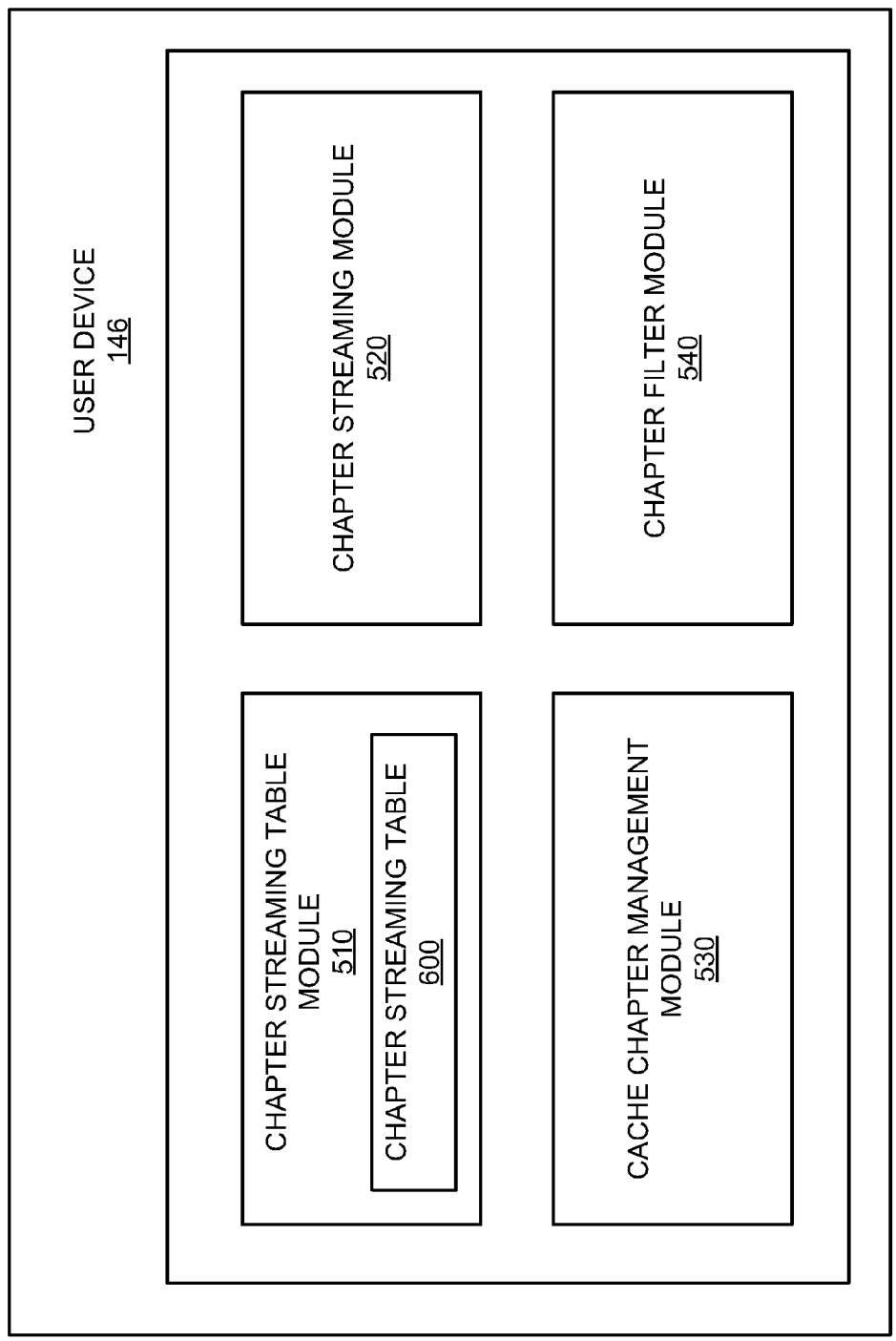
FIG. 5 is a diagram of exemplary functional components of the user device of FIG. 4.

User device 146 may include a chapterized streaming media client that allows user device 146 to stream, cache and play video content in a chapterized format, such as described with respect to FIG. 5. Although chapterized streaming is described with respect to user device 146, chapterized streaming may be provided to other end user devices, such as STBs 142 or DVRs.

FIG. 5 is a diagram of exemplary functional components of user device 146. In one implementation, the functions described in connection with FIG. 5 may be performed by one or more components of device 300 (FIG. 3). As shown in FIG. 5, user device 146 may include a chapter streaming table module 510, a chapter streaming module 520, a cache chapter management module 530, and a chapter filter module 540. User device 146 is described with respect to chapterized streaming table 600.

As shown in FIG. 5, chapter streaming table module 510 may include a chapterized streaming table 600 such as shown in FIG. 6. Chapter streaming table 600 may include information regarding the video content on a general basis related to each entire video program. For example, table 600 may include a (unique) media ID 602 (shown in table 600, e.g., as meda1, meda2, etc.), a (unique) show ID 604 (shown in table 600, e.g., as show 1, show 2, etc.), a show name 606 (shown in table 600, e.g., as Bad 1s, MOSH, etc.), a season number (Seas. Num) 608 (shown in table 600, e.g., as null, 1, etc.), an episode number (Ep Num) 610 (shown in table 600, e.g., as null, 1, etc.), and an episode name (Ep Name) 612 of a particular program (shown in table 600, e.g., as Pilot, Doc, etc.). Additionally, table 600 may include information regarding content on a per chapter basis such as a chapter number (chap num) 614 (shown in table 600, e.g., as 12.1, 12.2, etc.), a chapter name (chap name) 616 (shown in table 600, e.g., as Scn A, null, etc.), chapter tags 618 (that identify whether there is nudity, etc.), chapter rating 620 (e.g., PG13, R, etc.), a repeat (Rpt) status 622 (Yes or No), and a cached date 624 (shown in table 600, e.g., as meda1, meda2, etc.).

While FIG. 6 and table 600 shows a particular number and arrangement of information, in practice, table 600 may include additional information or different information, than shown in FIG. 6. For example, table 600 may include additional information for sub chapterization of the video programs.

Chapter streaming table module 510 may access and store information regarding video content in table 600 to track streamed chapters and monitor which chapters should be cached and for what period of time. Chapter streaming table module 510 may store the data in a single table/file (e.g., table 600) or split the data across multiple logical repositories. Chapter streaming table module 510 may store additional criteria such as whether the chapter is filterable, offsets for chapter variances, etc. For example, chapter streaming table module 510 may include information associated with a video program that has two variants in an introductory credit sequence: a first introductory scene and a second introductory scene. A chapter variant may be a recurring scene that does not occur at a predetermined time in different episodes. The introductory credits may be retained from any episode and these two variant portions (Chapter 1v1 and 1v2) may have identified time offset values showing where they should be overlayed or otherwise used to replace part of the cached copy (i.e., a pointer to a place in the video content at which the chapter variant is to be added).

Chapter streaming table module 510 may store subchapters in table 600 based on particular aspects of video content included in a particular chapter. According to one implementation, chapter streaming table module 510 may access a twelfth chapter of a movie (Bad 1s). The twelfth chapter may have two brief flashes of nudity. Chapter streaming table module 510 may store a chapter with potentially objectionable material broken into five subchapters with particular subchapters (e.g., 12.1, 12.3 and 12.5) having a lower rating (e.g. PG-13 for "Sexual Situation") while the two brief portions (12.2 and 12.4) with nudity might have a rating of R based on this content. In addition to the tags carried by the rest of chapter 12, additional tags may be applied to 12.2 and 12.4 to indicate the presence of and even type of nudity. Chapter streaming table module 510 may implement subchapters to allow finer-grained control than setting general parental controls and specific things that a parent finds offensive (e.g., language, nudity, etc.) may be blocked while others may be permitted for viewing. Tags 618 associated with the sub-chapters may contain the offending word/phrase, a general description of the offensive language (e.g. racial slur, blasphemous, etc.) and may be compared to a customer's stored preferences for blocking. In some implementations, persons or things may be blocked. In further implementations, a collection of sounds may be blocked (e.g. a wolf whistle, sound of gunfire, etc.).

Chapter streaming module 520 may request video content in a chapterized form based on information selected from table 600. The video content chapters may be presented in a visual form in a GUI of user device 146, for example, as shown above with respect to FIG. 2. The user may select a particular program and a particular chapter to begin viewing the program. In another embodiment, chapter streaming module 520 may display a user interface in which chapters may be selected in a Blu-ray or DVD format. When the user selects a chapter to be viewed, chapter streaming module 520 may request the particular chapter from cache chapter management module 530 and if the chapter is not currently stored on user device 146, chapter streaming module 520 may then request the chapter and upcoming (subsequent) chapters from chapter streaming server 132 or web server 130. Chapter streaming module 520 may provide a client side request for chapters from chapter streaming server 132 and indicate time points for beginning of each chapter. Alternatively, chapter streaming server 132 may provide downloads in a predetermined chapterized format determined at the server side. In any event, once chapter streaming module 520 has downloaded enough of the currently viewed chapter into the buffer of user device 146, chapter streaming module 520 may begin downloading additional chapters (i.e., other chapter streams). Chapter streaming module 520 may download chapters based on a manifest file and chapter index received from the service provider.

Cache chapter management module 530 may manage storage of chapters on user device 146. Cache chapter management module 530 may direct storage of chapters and subchapters based on predetermined rules. For example, many TV shows have a repetitive opening credit portion sandwiched between a cold open (i.e., a teaser at the beginning of the TV show) and first storyline unit. If a 22 minute show has a 1 minute opening credit sequence, approximately 4.5% of the streamed content is identical from one episode to the next and cache chapter management module 530 may direct storage of these repeated (622 in table 600) chapters. Additionally, cache chapter management module 530 may direct storage of studio identification clips.

Cache chapter management module 530 may retain chapters based on predetermined criteria. For example, cache chapter management module 530 may identify a matching/related media tag in the local cache data associated with identical/related media IDs and matching length/checksum, and retain a downloaded chapter for a period of time. The retained chapter's content may have minimum, recommended and maximum cache duration data associated therewith. For example, if a user is watching through all episodes of a television series, the first streamed episode may result in header data going into the local cache showing media ID (producer, show, episode) and length+checksum for each chapter. When chapter streaming module 520 begins to stream subsequent episodes, cache chapter management module 530 may check the cache and note that the second chapter is identical in length with a matching checksum. Cache chapter management module 530 may place the chapter on disk in unused space (not visible to the user, but tracked by cache chapter management module 530) in case the chapter is needed again.

Cache chapter management module 530 may store media ID values 602 and the chapter duration and checksum are placed in a table referencing the hidden location on the user device 146 where the chapter may be located. The stored chapter may be substituted into the subsequently streamed episodes of the TV show. Cache chapter management module 530 may also store chapters that are identified as repeating chapters. Cache chapter management module 530 may store the chapters for predefined retention periods, such as a minimum retention period of one day with a maximum of one week and a recommended period of two days. Each time the content is used, the recommended retention may be increased by a given percentage or time interval up to the maximum allowed.

According to an implementation, in instances in which user device 146 may receive the video content from multiple different networks (e.g., user device 146 is a mobile player) cache chapter management module 530 may cache chapters while in range of lowest cost networks (e.g., available Wi-Fi) thus reducing the volume of data that has to be transmitted across higher cost networks (e.g., 3G/4G networks) if a customer is streaming on the go.

Chapter filter module 540 may decide not to cache, display, or provide content based on rating, tags or other associated data. Alternatively, a user may configure their client to show all chapters with a given set of criteria (e.g. all chapters from a given show with the tag "space" sorted by episode and chapter). Chapter filter module 540 may be used to set or retrieve preference data stored on profile server 124. Optionally, chapter filter module 540 may store this data locally and include a restriction in requests sent by chapter streaming module 520 to web server 130 or chapter streaming server 132. The restriction may specify filtering criteria (e.g. no offensive language defined as the following language selected by the user, no male nudity, no nudity, no violence, no guns, only chapters with tag "food", etc.). Certain content may be considered non-filterable (e.g. credits).

Figure 7:
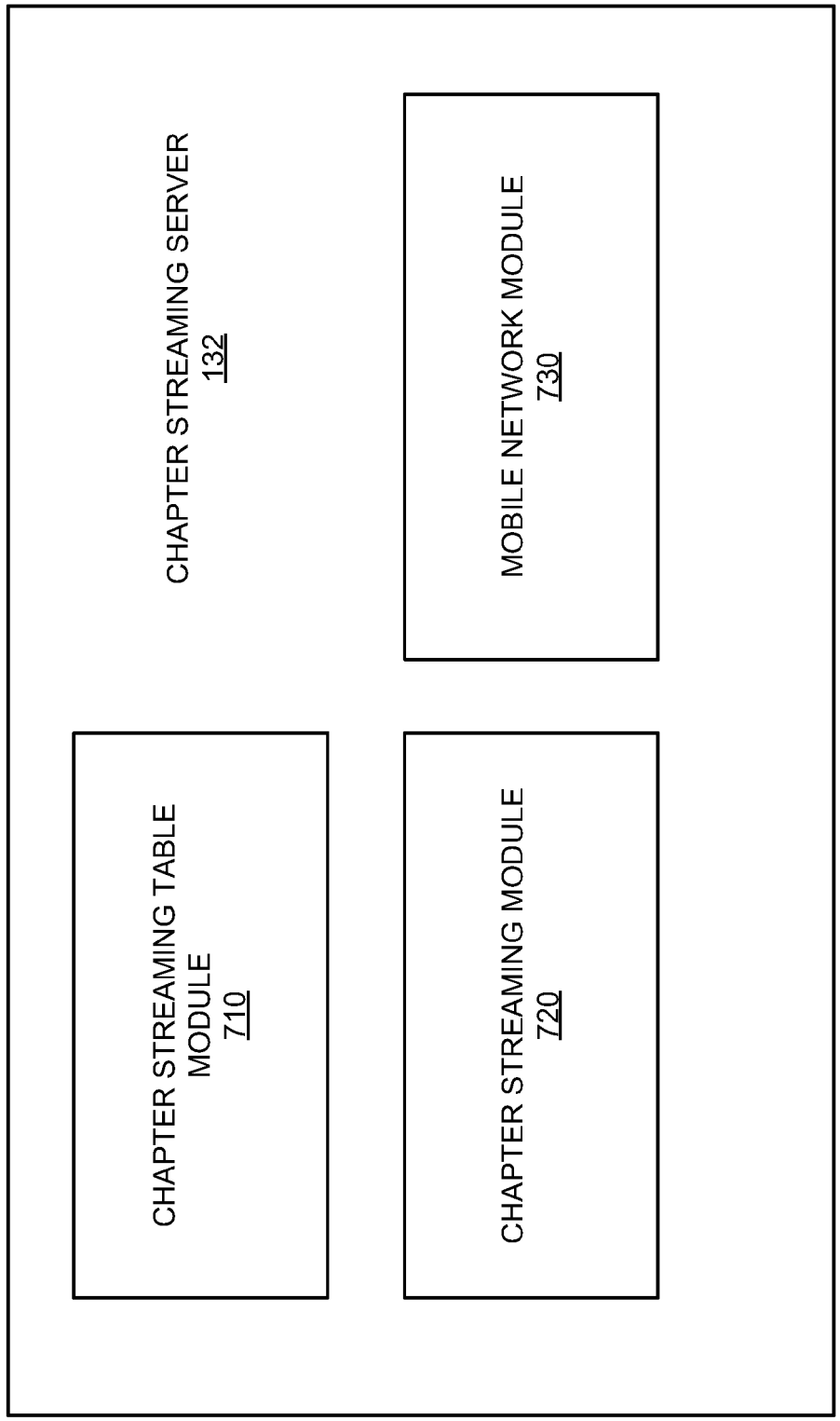
FIG. 7 is a diagram of exemplary functional components of the chapterized streaming server of FIG. 4.

FIG. 7 is a diagram of exemplary functional components of chapter streaming server 132. In one implementation, the functions described in connection with FIG. 7 may be performed by one or more components of device 300 (FIG. 3). As shown in FIG. 7, chapter streaming server 132 may include a chapter streaming table module 710, a chapter streaming module 720, and a mobile network module 730.

As shown in FIG. 7, chapter streaming server 132 may have an application interface where data about a requested object is provided in a parsable format for the requesting user device 146. Chapterized streaming server 132 may include both the network interface used to stream content and the media or this functionality may be split between several systems.

Chapter streaming table module 710 may store a chapter streaming table 600 similarly as described with respect to FIG. 6. Chapter streaming table module 710 may provide chapter streaming data for chapter streaming module 720 to format video content for streaming to user devices 146

Chapter streaming module 720 may format video content based on chapter information received from chapter streaming tables 600, such as locally stored table 600, tables 600 stored at an associated database, or files stored with the streamable content, etc. Chapter streaming module 720 may calculate frequent playback points from other users and then offer up these spots as a bookmark based on predetermined patterns of user interaction. Chapter streaming module 720 may segment TV shows into standardized chapters. The chapters may include a lead in credit or theme song. The chapters may also include small window for differentiated credits.

According to one implementation, chapter streaming module 720 may multicast the most highly demanded video content to a large number of user devices 146. For example, if a new episode of a particular TV program was being repeatedly streamed by a large number of user devices 146, chapter streaming module 720 may multicast the chapters at predetermined intervals (e.g., every twenty minutes) allowing any user devices 146 currently streaming the episode from chapterized streaming server 132 to inexpensively download the rest of the chapters beyond the point where the user is currently watching. Upon receiving a request for highly-demanded content, chapterized streaming module 720 may provide user device 146 with the initially requested chapterized content and tell user device 146 to join a multicast group for the specified high demand items to receive the rest of the content when the user begins their viewing session. User devices 146 may continue to stream currently viewed chapters from the chapterized streaming module 720 while the multicast chapter streams are cached. Once the multicast streams are cached, user devices 146 may finish playback from the cached chapters without having to download from chapterized streaming module 720. User devices 146 may receive the chapters subject to DRM and communicate with the service providers to receive an associated decoding key.

According to one implementation, chapter streaming server 132 may be implemented as a mobile server (using mobile network module 730) to provide streaming based on identified users subject to associated streaming or playback restrictions. For example, chapter streaming server 132 may be implemented as an airplane chapter streaming server to provide in-flight wireless services. Mobile network module 730 may identify a status associated with associated networks and/or equipment (e.g. an airplane preparing for landing) and initiate processes to limit chapter streaming services based on the status. Chapter streaming server 132 may provide buffering for viewers of video content in flight when allowed by mobile network module 730 (e.g., service provider may have a partnership with airlines to allow streaming of video content). Chapter streaming server 132 may provide an indicator to inform the user device 146 that the entire video content has been downloaded. Mobile network module 730 may provide an indication that the streaming service is complimentary and include a "push through" for sign up. Chapter streaming server 132 may provide additional buffering to finish watching a movie from the airline or to do an encore performance (e.g., the user may receive a 24 hour license that includes an additional lead in screen later on).

FIGS. 8A and 8B are diagrams of exemplary download status indicators 800*a* and 800*b* for two user devices 146. As shown in FIG. 8, download status indicators 800*a* and 800*b* may each include media IDs 602 and a percentage download indicator 802 for each chapter currently being streamed to user devices 146 (e.g., user device 146*a* and user device 146*b* (not shown) which may be associated with download status indicators 800*a* and 800*b*, respectively.

As shown in FIGS. 8A and 8B, download status indicators 800*a* and 800*b* may include a visual representation of the percentage of a download for video chapters associated with two different user devices 146, respectively (e.g., a first user device 146 and a second user device 146, not shown in FIG. 7). If first user device 146*a* does not have any associated parental/content filters set or has them set higher than the content being requested then all chapters may be downloaded.

If downloads to second user device 146 includes restrictions (e.g., based on parental/content filters) particular chapters (e.g., meda3) may not be requested from the service provider network based on rating and/or tags. This display may be used in troubleshooting. The display may also contain other data, such as rejected tracks and a reason (e.g., iconic or textual) for the rejection, etc.

FIG. 9 is a flowchart of an exemplary process 900 for performing chapterized streaming of video content. Process 900 may execute in user device 146. In another implementation, some or all of process 900 may be performed by another device or group of devices, including or excluding user device 146. It should be apparent that the process discussed below with respect to FIG. 9 represents a generalized illustration and that blocks/steps may be added or existing blocks/steps may be removed, modified or rearranged without departing from the scope of process 900.

At block 902, user device 146 may reserve a portion of its storage capacity (e.g., hard drive capacity) for related data caching. In this cache, a movie/show identifier, stream block identifier and checksum may be stored. This cache may be dedicated space or space not used for recorded content.

At block 904, user device 146 may send a request for a selected chapter of video content (e.g., by selecting a particular chapter, such as shown in FIG. 2). User device 146 may receive video content chapter information from chapter streaming server 132 (block 906). For example, when user device 146 begins to stream a show, movie or other media, a header block may be provided to indicate the media ID (production company ID: show/movie id: optional episode id) and an array of times and checksums for the various chapters (block 906) (i.e., from chapter streaming server 132 to user device 146).

User device 146 may determine whether the chapters are cached on user device 146 (block 908). For example, user device 146 may match entries in the cache with the chapters of the video content and identify matches in segment length and checksum. User device may identify chapters of the video content that are stored in the cache (block 910).

For non-matching chapters of the video content, user device 146 may initiate pre-caching of the upcoming chapters with a priority order based on the selected chapter (block 912). For example, user device 146 may download the current chapter and other chapters based on a predicted order of viewing. Chapters immediately following the currently viewed chapter may be given a higher download priority, and a corresponding greater allocation of download bandwidth. Alternatively, all remaining chapters may be downloaded at an equal priority speed.

At block 914, user device 146 may output (i.e., play back) the video content based on the selected chapter. For example, user device 146 may play the selected chapter and subsequent chapters. Each chapter may begin with an intra-frame from the video sequence so that no data is needed from the previous chapter's data to render the initial frame in the chapter. This also allows the content of an upcoming chapter to be readily appended to the next available memory block after the running chapter to enable smooth playback.

According to one implementation, user device 146 may pre-cache remaining chapters to allow the user an ability to skip past undesired chapters to reach the chapters they wish to currently view without wasting their time, congesting network backbone infrastructure, or placing load on the service provider's servers. In instances in which the user wants to re-watch a scene, the user may skip backward to see the chapter again rather than consuming bandwidth and increasing server load for this activity.

User device 146 may store the newly downloaded chapters of video content based on predetermined storage rules (block 916). For example, user device 146 may identify a checksum associated with a chapter that is repeated in different episodes of a TV show. The checksum may be stored locally or copied into a cloud storage associated with user device 146. Video content may be discarded even if checksum remains in database. User device 146 may determine whether the checksum for a next chapter is the same and may keep after the second viewing, indicating that the same video content chapter repeats in different episodes. Alternatively, user device 146 may identify video content chapters that have a specialized repetitive header, which may indicate that the chapter is a repeating chapter. User device 146 may retain the chapters based on a last viewed time associated with each chapter, existing cache capacity, and a probable frequency with which the chapter may be replayed. Alternatively, user device 146 may retain chapters based on a last in last out system.

Systems and/or methods described herein may provide chapterized downloads of video content. The chapterized downloads may allow precise transition between scenes when searching through video content. The chapters may be pre-cached allowing for smooth playback when a user jumps to different scenes in the video content.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 9, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the embodiments unless explicitly described as such. Also, as used herein, the articles "a", "an" and "the" are intended to include one or more items. Further, the phrase "based on" is intended to mean "based, at least in part, on" unless explicitly stated otherwise.

What is claimed is:

1. A computer-implemented method comprising:
receiving, by a video streaming device, from at least one user device, a request for a video content program based on a selected video content chapter of the video content program, wherein each video content chapter is a viewing unit that is a segment of the video content program determined based on a viewer observable logical scheme, and each video content chapter is restricted in length in a predetermined range within a particular scene;
sending, to the at least one user device, video content information that includes a list of video content chapters of the video content program,
wherein the at least one user device is to:
determine, for each listed video content chapter, whether the video content chapter has been previously stored on the at least one user device,
download particular chapters of the video content program in a priority order based on a selected chapter in response to a determination that the particular chapters have not been previously stored on the user device, and
play the video content program based on the selected chapter;
determining whether a plurality of user devices are streaming the video content program based on the selected chapter;
multicasting, by the video streaming device, a remainder of the video content program beyond the selected chapter at a predetermined interval to a plurality of user devices including the at least one user device in response to a determination that the plurality of user devices are streaming the video content program based on the selected chapter;
determining, by the at least one user device, whether the particular chapters are not filterable; and
downloading the particular chapters regardless of parental control settings and user preferences associated with the at least one user device when the particular chapters are not filterable.

2. The computer-implemented method of claim 1, further comprising:
storing, at the at least one user device, the downloaded chapters of the video content program;
indexing the downloaded chapters based on a video program identifier, a stream block identifier and a checksum; and
comparing the video content information to the video program identifier, the stream block identifier and the checksum to determine whether the particular chapters match the downloaded chapters.

3. The computer-implemented method of claim 1, wherein downloading the particular chapters of the video content program in the priority order by the at least one user device further comprises:
downloading the selected chapter at a first priority download rate; and
downloading remaining chapters of the video content program at a second priority download rate, wherein the second priority download rate is lower than the first priority download rate.

4. The computer-implemented method of claim 1, further comprising:
reserving a portion of a cache associated with the at least one user device to store video content chapters and associated information.

5. The computer-implemented method of claim 1, further comprising:
presenting, by the at least one user device, the video content chapters in a disc storage presentation format.

6. The computer-implemented method of claim 1, wherein the video content chapters include subchapters that include portions of the video content chapters.

7. The computer-implemented method of claim 1, wherein downloading, by the at least one user device, the particular chapters of the video content program further comprises:
downloading the particular chapters via a web server or a streaming media server.

8. The computer-implemented method of claim 1, wherein downloading, by the at least one user device, the particular chapters of the video content program further comprises:
excluding one or more of the particular chapters from download based on one or more of parental control settings or user preferences associated with the at least one user device.

9. The computer-implemented method of claim 8, wherein the parental control settings include block settings for video content chapters that include one or more of a racial slur, nudity, blasphemy, offensive language, a thing or a person in the video content.

10. The computer-implemented method of claim 1, further comprising:
identifying, by the at least one user device, a chapter variant associated with one of the particular chapters; and
determining an offset for the chapter variant.

11. The computer-implemented method of claim 1, wherein downloading the particular video content chapters further comprises:
downloading the video content chapters based on a mobile network, wherein the mobile network is associated with at least one of a motor vehicle or aircraft.

12. The computer-implemented method of claim 1, further comprising:
presenting a download status associated with the video content chapters in a graphical user interface associated with the at least one user device.

13. A video streaming device, comprising:
a memory to store a plurality of instructions; and
a processor configured to execute the instructions in the memory to:

receive, from at least one user device, a request for a video content program based on a selected video content chapter of the video content program, wherein each video content chapter is a viewing unit that is a segment of the video content program determined based on a viewer observable logical scheme, and each video content chapter is restricted in length in a predetermined range within a particular scene;

send, to the at least one user device, video content information that includes a list of video content chapters of the video content program, wherein the at least one user device is to:

determine, for each listed video content chapter, whether the video content chapter has been previously stored on the at least one user device, download portions of particular chapters of the video content program in a priority order based on a selected chapter in response to a determination that the particular chapters have not been previously stored on the at least one user device, play the video content program based on the selected chapter, and store the downloaded portions of the particular chapters of the video content program;

determine whether a plurality of user devices are streaming the video content program based on the selected chapter;

multicast a remainder of the video content program beyond the selected chapter at a predetermined interval to a plurality of user devices including the at least one user device in response to a determination that the plurality of user devices are streaming the video content program based on the selected chapter;

determine whether the particular chapters are not filterable; and download the particular chapters regardless of parental control settings and user preferences associated with the at least one user device when the particular chapters are not filterable.

14. The video streaming device of claim 13, where the processor is further to:

send the downloaded portions of the particular chapters of the video content program to be stored at the at least one user device in one of a last in last out basis or a most frequently accessed basis.

15. The video streaming device of claim 13, where the processor is further to:

exclude one or more of the particular chapters from download based on one or more of parental control settings or user preferences associated with the at least one user device.

16. The video streaming device of claim 13, where the processor is further to:

provide instructions to the at least one user device to present a download status associated with the video content chapters in a graphical user interface associated with the at least one user device.

17. A non-transitory computer-readable medium including instructions to be executed by a processor in a video streaming device, the instructions including one or more instructions, when executed by the processor, for causing the processor to:

receive, from at least one user device, a request for a video content program based on a selected video content chapter of the video content program, wherein each video content chapter includes a viewing unit that is a segment of the video content program determined based on a viewer observable logical scheme, and each video content chapter is restricted in length in a predetermined range within a particular scene;

send, to the at least one user device, video content information that includes a list of video content chapters of the video content program, wherein the at least one user device is to:

determine, for each listed video content chapter, whether the video content chapter has been previously stored in an associated device storage, download particular chapters of the video content program in a priority order based on a selected chapter in response to a determination that the particular chapters have not been previously stored in the associated device storage, and play the video content program based on the selected chapter; and exclude one or more of the particular chapters from download based on one or more of parental control settings and user preferences associated with a user account;

determine whether a plurality of user devices are streaming the video content program based on the selected chapter;

multicast a remainder of the video content program beyond the selected chapter at a predetermined interval to a plurality of user devices including the at least one user device in response to a determination that the plurality of user devices including the at least one user device are streaming the video content program based on the selected chapter;

determine whether the particular chapters are not filterable; and download the particular chapters regardless of parental control settings and user preferences associated with the at least one user device when the particular chapters are not filterable.

18. The non-transitory computer-readable medium of claim 17, wherein the one or more instructions further includes instructions for causing the processor to:

present a download status associated with the video content chapters in a graphic user interface associated with the device.

19. The non-transitory computer-readable medium of claim 17, wherein, when sending the video content information that includes the list of video content chapters of the video content program, the one or more instructions further includes instructions for causing the processor to:

determine a status associated with an associated mobile network; and limit streaming to the at least one user device based on the status associated with the associated mobile network.

* * * * *